Dec. 1, 1942.

H. G. VOIGHT ET AL

Re. 22,230

BORED-IN LOCK

Original Filed Sept. 8, 1939 2 Sheets-Sheet 1

Inventor

Henry G. Voight

& William S. Ephraim

By

Rockwell & Barlow

Attorneys

Dec. 1, 1942. H. G. VOIGHT ET AL Re. 22,230

BORED-IN LOCK

Original Filed Sept. 8, 1939 2 Sheets-Sheet 2

Inventor

Henry G. Voight

& William S. Esparda

By Rockwell & Barthelow

Attorneys

Reissued Dec. 1, 1942

Re. 22,230

UNITED STATES PATENT OFFICE 22,230

BORED-IN LOCK

Henry G. Voight, New Haven, and William S. Edwards, Hamden, Conn., assignors to Sargent & Company, New Haven, Conn., a corporation of Connecticut Original No. 2,220,591, dated November 5, 1940, Serial No. 293,954, September 8, 1939. Application for reissue August 29, 1941, Serial No. 408,908

10 Claims. (Cl. 292—169)

This invention relates to door locks, and more particularly to so-called tubular or "bored-in" locks which may be installed in a door by making cylindrical openings through the edge and the face of the door, so that the usual more or less tedious mortising of the door to receive the lock will not be required.

More particularly the invention relates to that type of lock which shall be provided with a latch bolt and with means for dogging the latch bolt from one side of the door so that the latter may not be opened from the other side. It is also essential in a lock of this kind to provide means whereby, if the dogging mechanism is set, it will be released by the turning of the knob upon one side of the door.

In the past door locks of this general character have been suggested, and it has been more or less common practice to provide a push button in the knob on the inside of the door, which push button may be operated to dog the outside knob, or in some way prevent the operation of the latch by the outside knob. As such a push button must operate in some manner through the knob spindle, this practice has been attended with a construction involving more or less expense, as it requires a somewhat complex mechanism.

One object of the present invention is to provide a door lock of the character described, which lock shall be of very simple construction and at the same time efficient and positive in operation.

A still further object of the invention is the provision of a door lock of the character described, wherein the mechanism for dogging the latch bolt comprises a movable element mounted in the rose which carries the door knob at the inside of the door, which element is extended into the lock case so as to cooperate with certain parts of the lock mechanism.

A further object of the invention is the provision of a lock of the character described, wherein the inside and outside door knobs are mounted on independently movable spindles, the spindles, however, being connected together in such a manner that separation thereof will be prevented, while at the same time one of the spindles may be dogged against movement while the other is permitted movement to withdraw the latch.

A still further object of the invention is the provision of a dogging mechanism for the latch bolt, which dogging mechanism is arranged to be held in dogging position by a yoke or similar mechanism integral with the bolt itself, whereby when the inner knob is turned the dogging mechanism will be released, and will be automatically moved to inoperative position.

Still another object of the invention is the provision of a lock of the character described wherein means will be provided for opening the door from the outside when required, even though the bolt may have been dogged from the inside.

To these and other ends the invention consists in the novel features and combinations of parts to be hereinafter described and claimed.

Figure 1:
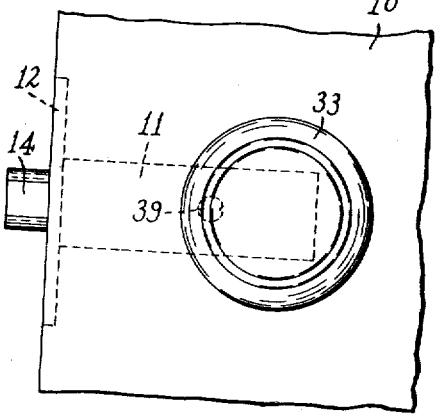
Fig. 1 is a side elevational view of a portion of a door provided with a lock embodying our invention.
Figure 2:
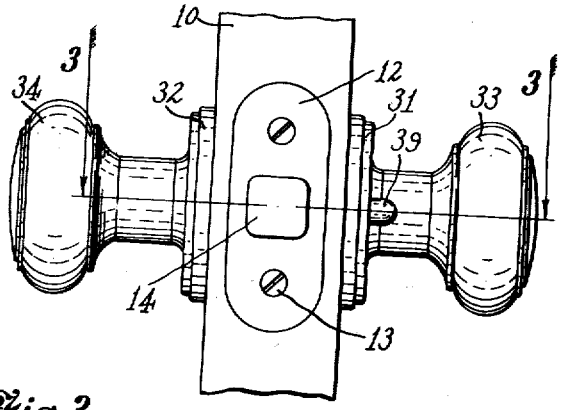
Fig. 2 is a face view of the edge of the door.

To illustrate a preferred embodiment of our invention we have shown in Fig. 1 of the drawings a portion of a door 10 within which is mounted a case 11 having a face plate 12 secured to the door by screws 13, through which face plate may project a latch bolt 14.

Figure 3:
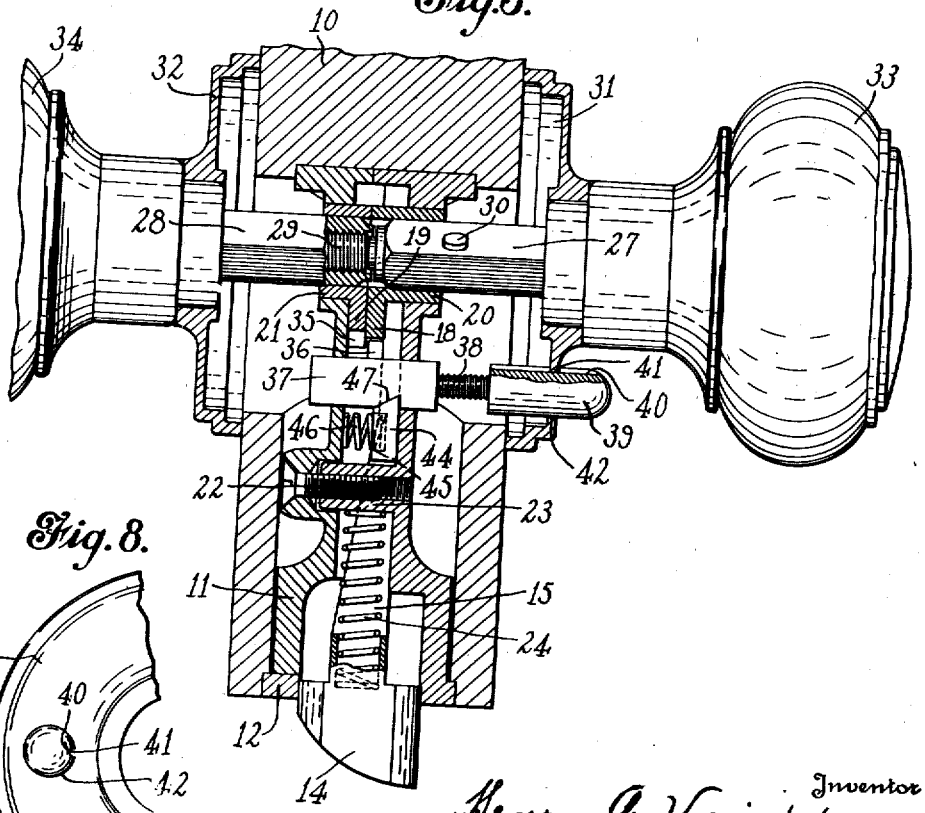
Fig. 3 is a sectional view on line 3—3 of Fig. 2.
Figure 8:
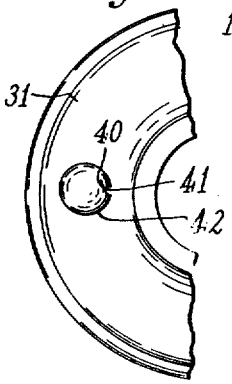
Fig. 8 is a fragmentary face view of a portion of the rose surrounding the knob spindle.

The latch case is shown more particularly in Fig. 3, from which it will be observed that the case is of a form to be received in a cylindrical bore in the edge of the door. The bolt 14 is slidably mounted in the case, and is provided with a retracting member in the form of a bifurcated stem or yoke 15 the legs of which extend rearwardly and are provided with laterally turned ends 16 and 17 to be engaged by rollbacks 18 and 19, which rollbacks are attached to hubs 20 and 21 rotatably journaled in openings in the walls of the case.

The case is divided into two portions which are secured together by means of the screw 22 passing through an opening in one part or the cover of the case, and being received in a threaded post 23 secured to the other part. The latch bolt is urged to protracted position by a spring 24 disposed between the legs of the bifurcated yoke or stem of the latch bolt and acting at its rear end against a lug 25 attached to the post 23.

Inserted through the hubs 20 and 21 is a spindle mechanism comprising the two parts 27 and 28. These spindle sections are of rectangular cross-section and are received in rectangular openings in the hub members, so that rotation of the spindle will effect rotation of the hubs.

One of the spindle sections, that designated by the numeral 27, as shown in the drawings, is provided with a threaded rod or post 29 which extends from the end of this spindle and is received in a threaded opening in the spindle 28. Having a threaded connection of this character, the spindles are independently rotatable, and, moreover, are prevented from longitudinal separation, for when the lock has been applied to the door, the rotation of the spindle will, of course, be limited to a partial turn by the latch mechanism with which they cooperate, as is usual in door latches. Also one of the spindles, such as the spindle 27, may be provided with a stop member 30, which is designed to contact the adjacent hub 20 and limit the insertion of this spindle into the hub so that the break or junction between the two spindles will lie substantially at the plane of separation of the hubs 20 and 21. That is, the stop 30 will prevent the spindle 27 from being inserted into the door to such an extent that its non-circular portion will enter the hub 21. In order to space apart the non-circular portions of the spindles to some extent, the adjacent ends thereof, as shown in Fig. 3, are slightly reduced in cross-sectional size so as to obviate the likelihood of either spindle being non-rotatably engaged with both of the rollback hubs.

Secured to the inside and the outside of the door respectively are the roses 31 and 32, and inside and outside knobs 33 and 34 are non-rotatably mounted upon the spindles 27 and 28 in the usual manner. From the foregoing it will be apparent that rotation of the inside knob 33 will effect rotation of the hub 20, which through the engagement of its rollback 18 with the turned end 16 or 17 of the yoke 15 will effect retraction of the latch bolt. This will take place independently of any movement of the outside knob 34, and likewise the rotation of this knob will effect rotation of the spindle section 28, and likewise retract the latch through the rollback 19 without movement of the other spindle section 27 or the inner knob 33.

Figure 4:
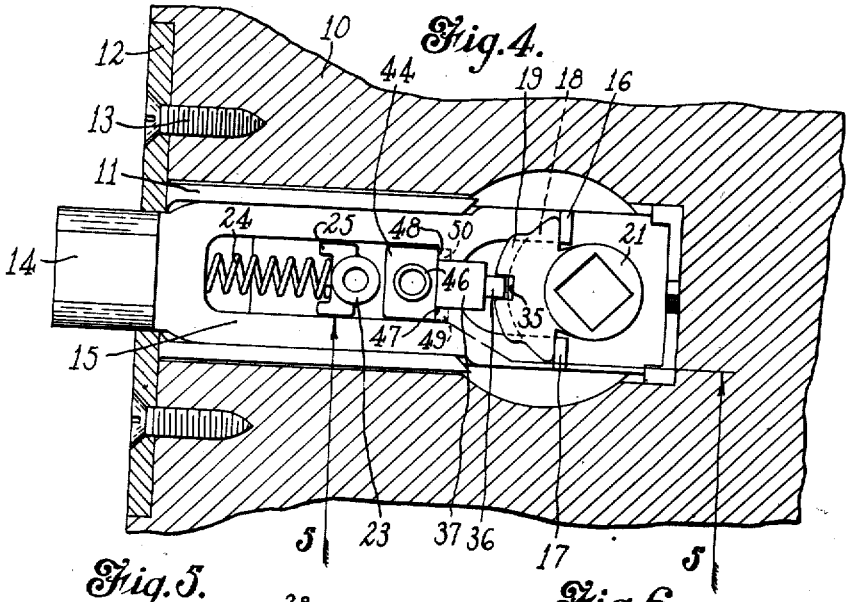
Fig. 4 is a view of the lock case and latch mechanism with the cover removed to show the interior construction.

It will be noted that the rollback 19, operated by the outside knob 34, is slightly larger than the rollback 18, so as to project toward the latch bolt to a greater extent than the other rollback, as shown in Fig. 4. This portion of the rollback 19 is provided with a recess 35, which is adapted to receive a detent 36 carried by a block or plunger member 37, shown more particularly in Fig. 3, and slidably mounted in openings in the walls of the case 11. The member 37 is provided with a threaded opening adapted to receive the threaded stem 38 of a push button 39 which projects through an opening in the rose 31 at the inside of the door. By means of the threaded connection of the button 39 and member 37 the spacing of these two parts may be adjusted to accord with the thickness of the particular door in which the lock is being mounted, so that the button 39 will always project the required distance for operation. In order to prevent the button 39 from being unscrewed, it may be provided with a longitudinal surface groove 40, within which is received a projection 41 in the edge of the opening 42 in the rose 31 through which the button projects. It will be understood that in installation of the device the button 39 is first screwed into the member 37, and the rose 31 is thereafter slipped over the button.

Carried by the member 37 is a lug 44 having upon its upper surface a socket 45 within which is mounted a compression spring 46. This spring bears at its outer end against the opposite side of the case so as to force the member 37 toward the inside knob or toward the right, as shown in Fig. 3. The lug 44, as shown in Fig. 5, is disposed between the legs of the bifurcated latch bolt stem 15, and its rear edge is beveled upon opposite sides of member 37, as shown at 47 and 48, which beveled portions cooperate with similarly shaped portions 49 and 50 on the legs of the stem 15.

Figure 5:
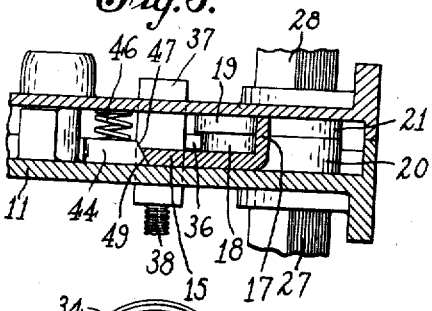
Fig. 5 is a sectional view on line 5—5 of Fig. 4.
Figure 6:
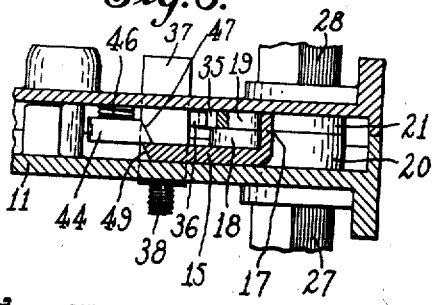
Fig. 6 is a view similar to Fig. 5 but showing the parts in another position.

The normal position of the lug 44 is shown in Fig. 5 of the drawings, wherein this member is forced against one wall of the case by the spring 46. When the member 37 is pushed inwardly, as shown in this figure, the beveled edge of the member 44 slides by the correspondingly shaped edge of the yoke, camming the yoke to the right to a slight extent. When the lug 44 has been moved to a sufficient extent to clear the portions 49 and 50 of the yoke, the latter is again protracted by its spring 24, thus lying below the lug 44, as shown in Fig. 6, and holding the member 44 in this position against the action of the spring 46.

The operation of the parts may now be briefly described. The normal position of the parts is shown in Figs. 3 and 5. If it is desired to dog the latch against operation by the outside knob 34, the button 39 is pushed inwardly against the tension of the spring 46. This serves to move the detent 36 into the slot 35 of the rollback 19 so as to dog this rollback against operation. At the same time the lug 44 is moved from the position shown in Fig. 5 to the position shown in Fig. 6, wherein the portions 49 and 50 of the yoke 15 stand below the edge of the lug and prevent its being returned to its original position by the spring 46. It will be understood that while the lock is now dogged against operation by the outside knob, the inside rollback 18 is free to turn and the door may be freely opened by the inside knob 34, the spindle section 27 and the hub 20 rotating independently of the spindle section 28 and hub 21. It will also be observed that when the inside knob is rotated and the latch withdrawn, the portions 49 and 50 of the yoke stem 15 will be moved from below the lug 44, and the latter, together with the member 37 and push button 39, will be returned to their original or inoperative position by the spring 46.

In connection with some locks, particularly those adapted to be applied to bathroom doors, it is advantageous to provide for the opening of the door from the outside in an emergency, even though the latch may have been dogged from the inside. In the present case such means is shown in Fig. 7 of the drawings, wherein a special form of spindle is illustrated, which spindle is adapted to be employed with the latch mechanism shown in Figs. 1 to 6.

Figure 7:
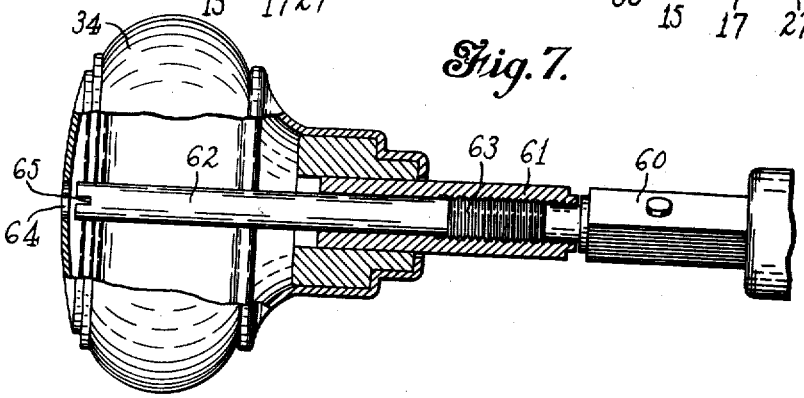
Fig. 7 is a view partly in section showing a modified form of spindle.

As shown in Fig. 7, the spindle comprises the two sections 60 and 61 generally similar to the spindle sections previously described, in that the section 60 is provided with a rod 62 threaded at 63 so as to have a threaded connection with the hollow spindle 61. In this case, however, the spindle 61 is hollow throughout its length, and the rod 62 is extended so as to project through the outside knob 34 to a position in which the end of the spindle will be accessible through a small opening 64 in this knob, the opening being provided, of course, directly opposite the end of the spindle. The latter may be provided with a transverse groove 65 so that in an emergency a screw driver or similar tool may be inserted in the groove 65 and the rod 62 rotated, even though the knob 34 and associated parts may be dogged against rotation. It will be obvious that as the rod 62 has a threaded connection in the spindle 61, it will rotate independently of this spindle, and as this rod is carried by the inside spindle 60, its rotation will effect the rotation of the inside spindle, and therefore effect withdrawal of the latch.

While we have shown and described some preferred embodiments of our invention, it will be understood that it is not to be limited to all of the details shown, but is capable of modification and variation within the spirit of the invention and within the scope of the appended claims.

What we claim is:

1. In a door latch, a unitary casing insertable through an opening in the edge of the door, a latch bolt reciprocably mounted therein, a retracting member for said bolt within the casing, inner and outer knobs, means connecting said member to said knobs for independent operation thereby comprising independently rotatable spindle sections one of which is connected to each knob for rotation thereby, a dogging member movably mounted in the casing and disposed forwardly of said spindle sections and having means preventing operation of said retracting member by one of said knobs, and means integrally formed with said bolt adapted to engage said dogging member to hold the same in dogging position.

2. In a door latch, a unitary casing insertable through an opening in the edge of the door, a latch bolt reciprocably mounted therein, a retracting member for said bolt within the casing, inner and outer knobs, means connecting said member to said knobs for independent operation thereby comprising independently rotatable spindle sections one of which is connected to each knob for rotation thereby, a dogging member movably mounted in the casing and having means preventing operation of said retracting member by one of said knobs, an actuating member connected to the dogging member and extending through the door at one side of the inner knob, and cooperating means on said retracting member and said dogging member whereby the former holds the latter in dogging position.

3. In a door latch, a unitary casing insertable through an opening in the edge of the door, a latch bolt reciprocably mounted therein, a retracting member for said bolt within the casing, inner and outer knobs, means connecting said member to said knobs for independent operation thereby comprising independently rotatable spindle sections one of which is connected to each knob for rotation thereby, a dogging member movably mounted in the casing and having means preventing operation of said retracting member by one of said knobs, an actuating member connected to the dogging member and extending through the door at one side of the inner knob, cooperating means on said retracting member and said dogging member whereby the former holds the latter in dogging position, and means to restore said dogging member to inoperative position when said retracting member is moved to retract the bolt.

4. A door latch comprising a unitary casing insertable through an opening in the edge of the door, a latch bolt reciprocably mounted therein and having a rearwardly projecting stem, inner and outer knobs, a pair of rollbacks rotatably mounted in the casing each of which is operated by one of said knobs, said rollbacks being engaged with said stem to retract the bolt, a dogging member slidably mounted in the walls of the casing between the bolt and rollbacks and having means to engage one of the rollbacks to prevent operation thereof by the respective knob, a lug on said member adapted to be engaged by said stem to hold said member in dogging position, and an actuating member adjustably connected to the dogging member and extending through the door at one side of the knob for manual operation.

5. A door latch comprising a unitary casing insertable through an opening in the edge of the door, a latch bolt reciprocably mounted therein and having a rearwardly projecting stem, inner and outer knobs, a pair of rollbacks rotatably mounted in the casing each of which is operated by one of said knobs, said rollbacks being engaged with said stem to retract the bolt, a dogging member slidably mounted in the rolls of the casing between the bolt and rollbacks and having means to engage one of the rollbacks to prevent operation thereof by the respective knob, a lug on said member adapted to be engaged by said stem to hold said member in dogging position, a spring to restore said dogging member to inoperative position when said stem is moved to disengaging position, and an actuating member adjustably connected to the dogging member and extending through the door at one side of the knob for manual operation.

6. A door latch comprising a unitary casing insertable through an opening in the edge of the door, a latch bolt reciprocably mounted therein and having a rearwardly projecting bifurcated stem, inner and outer knobs, a pair of rollbacks rotatably mounted in the casing each of which is operated by one of said knobs, said rollbacks being engaged with the stem to retract the bolt, a dogging member slidably mounted in the walls of the casing between the legs of said stem and having means to engage one of said rollbacks to prevent operation thereof, a lug on said member, means on the legs of said stem to engage said lug to hold said member in dogging position, and an actuating member adjustably connected to the dogging member and extending through the door at one side of the knob for manual operation.

7. A door latch comprising a casing, a latch bolt reciprocably mounted therein and having a rearwardly projecting bifurcated stem, inner and outer knobs, a pair of rollbacks rotatably mounted in the casing each of which is operated by one of said knobs, said rollbacks being engaged with the stem to retract the bolt, a plunger slidably mounted in openings in opposite walls of the casing between the legs of the stem, a detent projecting from one side of the plunger to engage one of said rollbacks to prevent operation thereof, a lug projecting from the other side of said plunger, means on the legs of said stem adapted to engage said lug to hold the plunger in a depressed position, an actuating member adjustably connected to the plunger and extending through the door at one side of the knob for manual depression of said plunger, and a spring acting against said lug to urge said plunger outwardly when disengaged by the means on the legs of the stem.

8. In a door latch, an elongated unitary casing insertable through a cylindrical opening in the edge of the door, a bolt reciprocably mounted in the casing, inner and outer hub members rotatably mounted in the casing each having a rollback thereon, independently operable inner and outer spindles non-rotatably connected respectively with said hub members, a knob on each of said spindles, means operatively connecting said rollbacks to the bolt whereby the bolt is retracted by rotation of the hubs, a dogging member slidably mounted in the casing to move transversely to the longitudinal axis of the casing and transversely with respect to the plane of the door and being disposed forwardly of the hub members, said dogging member having means to engage and prevent movement of one of said hubs, a part connected to said dogging member projecting through the face of the door to be moved inwardly by manual engagement, means to releasably hold said dogging member in its operative position when moved thereto, and means effective upon retraction of the bolt to restore said dogging member to its inoperative position.

9. In a door latch, an elongated unitary casing insertable through a cylindrical opening in the edge of the door, a latch bolt reciprocably mounted therein, inner and outer knobs, means connecting said bolt to said knobs for independent operation thereby comprising independently rotatable spindle sections upon each of which one of said knobs is mounted, and hub members rotatably mounted in the casing having openings in which said spindles are slidably and non-rotatably received, a dogging member movably mounted in the casing forwardly of said hubs to move transversely to the plane of the door and having means preventing operation of said bolt by one of said knobs, a depressible actuating member adjustably connected to the dogging member and extending through the door at the forward side of the inner knob, means spring pressed into engagement with said dogging member to hold the latter in its operative position when it is moved thereto, and means effective upon retraction of the bolt to restore the dogging member to inoperative position.

10. In a door latch, an elongated unitary casing insertable through a cylindrical opening in the edge of the door, a latch bolt reciprocably mounted therein, inner and outer knobs, means connecting said bolt to said knobs for independent operation thereby comprising independently rotatable spindle sections upon each of which one of said knobs is mounted, and hub members rotatably mounted in the casing having openings in which said spindles are slidably and non-rotatably received, the outer ends of said hub members terminating substantially flush with the casing, a dogging member movably mounted in the casing forwardly of said hubs to move transversely to the plane of the door and having means preventing operation of said bolt by one of said knobs, a depressible actuating member adjustably connected to the dogging member and extending through the door at the forward side of the inner knob, means spring pressed into engagement with said dogging member to hold the latter in its operative position when it is moved thereto, and means effective upon retraction of the bolt to restore the dogging member to inoperative position.

HENRY G. VOIGHT.
WILLIAM S. EDWARDS.

CERTIFICATE OF CORRECTION.

Reissue No. 22,230. December 1, 1942.

HENRY G. VOIGHT, ET AL.

It is hereby certified that error appears in the printed specification of the above numbered patent requiring correction as follows: Page 3, second column, line 29, claim 5, for "the rolls" read --the walls--; and that the said Letters Patent should be read with this correction therein that the same may conform to the record of the case in the Patent Office.

Signed and sealed this 12th day of January, A. D. 1943.

Henry Van Arsdale,
Acting Commissioner of Patents.

(Seal)